July 19, 1949.  J. J. HAGAN  2,476,597
BASIN TAP CONNECTOR
Filed Sept. 18, 1946
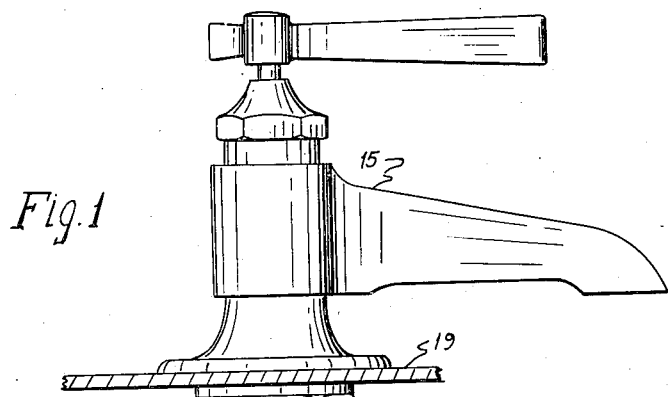
Fig.1
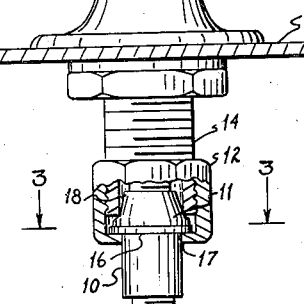
Fig.2
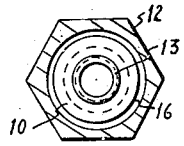
Fig.3
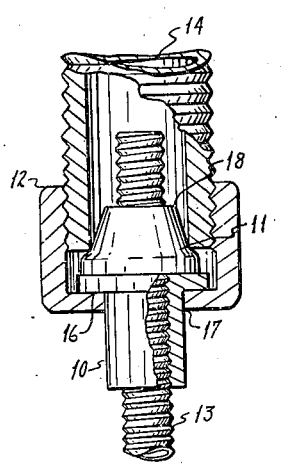
INVENTOR.
JOHN J. HAGAN
BY Joshua R. H. Potts
HIS ATTORNEY Patented July 19, 1949

2,476,597

UNITED STATES PATENT OFFICE 2,476,597

BASIN TAP CONNECTOR

John J. Hagan, Philadelphia, Pa.

Application September 18, 1946, Serial No. 697,648

3 Claims. (Cl. 285—122)

This invention relates to taps for wash basins such as are generally referred to as spigots, faucets, valves, and the like, and in particular includes the connection between the valve or tap and the water supply pipe, wherein the pipe is connected to a threaded shank extending from the tap or valve body.

Water taps for basins and the like are provided with a threaded shank or extension which passes through an opening in the upper surface of a wash basin or the like, with the tap above and normally with the shank extending below. A lock nut is screwed on the shank to secure the tap in position, and the water supply tube is usually connected to the threaded shank by a union or coupling member threaded on the shank; but the water supply tube is only slidably mounted in the connection, and the only safeguard against leakage is a packing washer, wrapping, or thread wrapped around the tube and clamped against the end of the shank by the union or coupling member.

Continuous opening and closing of the valve member of the tap and also jarring from other sources causes the tube to work downward, and leaks develop in the connection.

In the connector of this invention, a packing washer with a conical upper surface is provided on the tube with the conical surface of the washer adapted to be wedged into the lower end of the shank of the tap by the coupling member, and to further insure against leakage and also against the connection working loose, a flanged threaded bushing is screwed on the water supply tube with the packing washer resting upon the flange, and with the end of the coupling member extending below the flange and holding the packing washer against the end of the shank by clamping action through the flange.

In a connector of this type, the water supply tube is positively held in the end of the tap so that the possibility of the tube sliding downward or out of the connection is definitely eliminated.

The purpose of this invention is to provide an improved connection between taps, particularly for wash basins, and the supply tubes through which water is supplied to the taps.

Connectors of this type are normally made with a sliding connection between the water supply tube and tap, because the distance from the end of a water supply pipe to the surface of a water basin or the like is very indefinite, and any form of positive connection is, therefore, impossible. With this thought in mind, the connector of this invention contemplates as a primary element a flanged bushing threaded on the water supply tube, wherein the position of the packing washer may readily be adjusted to compensate for varying distances between the end of the tap and the water supply pipes.

Another object is to provide a positive connector for associating water supply tubes and taps, which may be applied to taps now installed.

Another object is to provide a connector for positively holding water supply tubes in taps in which sliding of one element in relation to the other is positively eliminated.

A further object is to provide a connector by which water supply tubes may be connected to taps and the like in which a packing gland is secured in the end of a threaded shank or nipple of a tap by wedge action.

With these and other objects in view, the invention embodies a flanged bushing threaded on a water supply tube associated with a tap, a conical-shaped washer also on the water supply tube and associated with the flange, and a threaded coupling member with the threaded end adapted for screwing on the shank or nipple of the tap with a reduced opening in the opposite end positioned under the flange of the bushing and adapted for holding the flange, packing washer, and shank in clamping relation.

For a full and more complete understanding of the invention, reference may be had to the following description and accompanying drawing, wherein:

Figure 1 is a view showing the application of the connector in the position of securing a water supply tube to a threaded shank or nipple extending from a tap or valve.

Figure 2 is an enlarged detail showing the connector with parts broken away and parts in section.

Figure 3 is a cross section through the connector showing the relative shape of the elements.

Referring now to the drawing, wherein like reference characters denote corresponding parts, the connector of this invention, in the preferred form, is provided with a threaded bushing 10, a packing washer 11, and a coupling 12.

The bushing 10 is adapted to be screwed on a threaded end of a water supply tube 13, and the coupling 12 is adapted to be screwed on a threaded shank 14 of a tap 15.

One end of the bushing 10 is provided with a flange 16, and one end of the coupling 12 is provided with an opening 17, the diameter of which is smaller than that of the threaded opening in the opposite end and slightly larger than the outside diameter of the bushing 10. This end of the coupling 12 extends under the flange 16, and as the coupling is screwed on the shank 14, the flange 16 bears against the washer 11, thereby clamping the washer against the end of the shank 14. The washer 11 is formed with a central opening to receive the tube 13, and the upper surface 18 thereof is of a conical shape, sloping inward toward the outer end.

In making the connection, the outer surface of the tube 13 is threaded, the bushing 10 with the coupling 12 thereon is screwed on the tube, and the washer 11 is slid over the said tube and placed against the end of the bushing, also being positioned on the tube.

When the elements are in position, the coupling 12 is screwed on the end of the shank 14, and as shown in the drawing, the conical surface of the washer 11 will be drawn into the end of the shank to form a positive seal.

Before making the positive connection, the position of the bushing 10 is adjusted on the tube 13 to compensate for varying distances that may exist between the upper surface of the wash basin 19, and the floor or supply pipe.

While a preferred specific embodiment of the invention is hereinbefore set forth, it is to be clearly understood that the invention is not to be limited to the exact construction illustrated and described because various modifications of the details may be provided in putting the invention into practice within the purview of the appended claims.

What is claimed is:

1. A connector of the class described, comprising a bushing threaded on the inside, adapted to receive a water supply tube, and having a flat flange on the outside thereof, a nipple of larger inside diameter than said tube and having outside threads thereon, a washer between said bushing and said nipple, said washer being slidable on said tube, and a coupling adapted to clamp said bushing against said nipple with the washer between.

2. A connector of the class described, comprising a bushing threaded on the inside only, adapted to receive a water supply tube, and having a flat flange on the outside thereof, a nipple of larger inside diameter than said tube and having outside threads thereon, a washer slidably mounted on the tube and arranged between said flange and an adjacent portion of said nipple, and a coupling adapted to clamp said bushing against said nipple with the washer between, said bushing having a portion protruding exteriorly of said coupling.

3. A connector of the class described, comprising a tubular bushing threaded entirely on the inside, free of outside threads, adapted to receive a water supply tube, and having a flat flange on the outside thereof, a nipple having an inside diameter large enough to receive said tube and having outside threads thereon, a conical washer between said flange and an adjacent portion of said nipple, and a coupling adapted to clamp said bushing against said nipple with the washer between.

JOHN J. HAGAN.

REFERENCES CITED

The following references are of record in the file of this patent:

UNITED STATES PATENTS

| Number | Name | Date |
| --- | --- | --- |
| 893,365 | Pickles | July 14, 1908 |
| 896,204 | Glauber | Aug. 18, 1908 |
| 1,301,245 | Fox | Apr. 22, 1919 |